JOHN ROLLINS.
Improvement in Animal Traps.

No. 124,976. Patented March 26, 1872.

Witnesses:
Gustave Dieterich
Francis McArdle

Inventor:
John Rollins.
Per Wm. ...
Attorneys.

124,976

UNITED STATES PATENT OFFICE.

JOHN ROLLINS, OF KINGSTON, TENNESSEE.

IMPROVEMENT IN ANIMAL-TRAPS.

Specification forming part of Letters Patent No. 124,976, dated March 26, 1872.

*To all whom it may concern:*

Be it known that I, JOHN ROLLINS, of Kingston, in the county of Roane and State of Tennessee, have invented a new and useful Improvement in Self-Setting Animal-Trap; and I do hereby declare that the following is a full, clear, and exact description thereof, which will enable others skilled in the art to make and use the same, reference being had to the accompanying drawing forming part of this specification.

Figure 1:
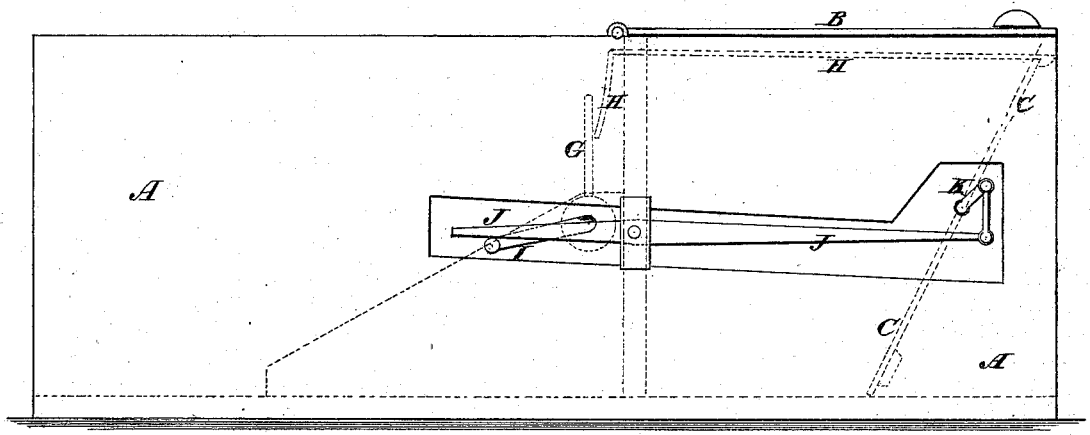
Figure 2:
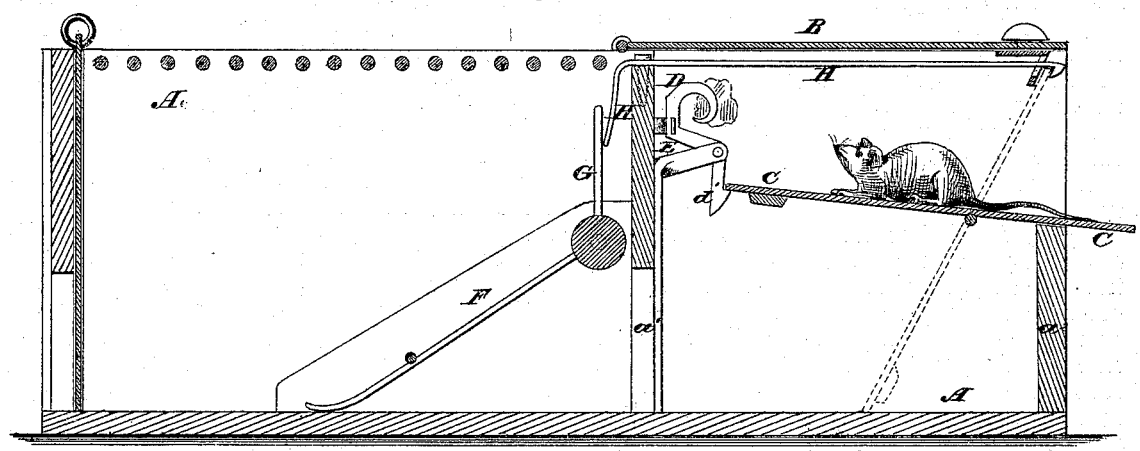
Figure 3:
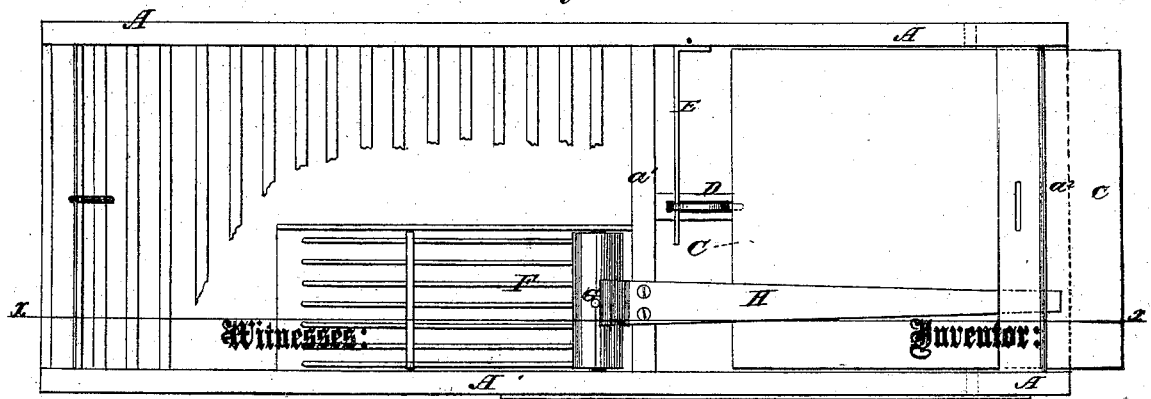

Figure 1 is a side view of my improved trap, the plate being removed. Fig. 2 is a vertical longitudinal section of the same taken through the line $x\ x$, Fig. 3. Fig. 3 is a top view of the same, part being broken away to show the construction.

Similar letters of reference indicate corresponding parts.

My invention has for its object to furnish an improved animal-trap simple in construction, effective in operation, and which shall not be liable to get out of order, and so constructed that the caught animal shall set the trap for another one; and it consists in the construction and combination of various parts of the trap, as hereinafter more fully described.

A is the box of the trap, which is divided into two compartments by a partition, $a^1$. The first or bait compartment is covered with a close top or cover, B, so as to exclude the light. The cover B is hinged at one edge, and secured at the other, when closed, by a button or other convenient fastening, so that it may be readily opened to arrange the bait. The upper part of the outer end $a^2$ of the bait-chamber is cut away to form an entrance for the animal. C is the platform, which is pivoted to the sides of the box A. The inner end of the platform C should be made the longer, or should be weighted to make it the heavier, so that when left free the said inner end may drop to and rest upon the bottom of the trap, while its outer end rests against the top or cover B, near its outer edge, thus closing the entrance, and preventing the entrance of any light through said passage. D is the bait-hook, which is pivoted to an arm or bracket attached to the middle part of the partition $a^1$. The lower part of the bait-hook has a catch, $d'$, formed upon it to receive the edge of the pivoted platform C in setting the trap. The upper part of the hook D is so formed as to receive the bait, and is held in such a position that the catch $d'$ will receive and hold the edge of the platform C, when raised, by the spring E, the inner end of which is connected with the said hook and the outer end is attached to the side of the box A. In the lower part of the partition $a^1$ is formed a hole leading from the first or bait-chamber into the second or prison-chamber, and which is closed by a swinging gate, F, opening into the prison-chamber. The top of the prison-chamber is formed of wires, so that the light can pass in freely. To the pivoting-rod or shaft of the gate F is attached an arm, G, which rests against the downwardly-projecting end of a lever, H, which is pivoted to the upper edge of the partition $a^1$. The outer end of the lever H extends to the box A and has a catch formed upon it to catch upon and lock the outer edge of the platform C, when raised, as shown in dotted lines in Figs. 1 and 2. Upon the outer end of the rod or shaft of the gate F is formed a crank, I, upon the crank-pin of which rests the lever J, which is pivoted to the side of the box A, and the other end of which is connected with a crank or pulley, K, formed upon or attached to the pivot of the platform C. The crank I K and lever J may be placed in a recess formed in the outer side of the side of the box A, and may be covered by a plate, L, attached to said side. By this construction, as the animal in seeking to get the bait trips the platform C he is precipitated into the bait-chamber, and at the same time the upper edge o the platform C is caught and held by th catch of the lever H, making the bait-chamber dark. The animal sees light through the hole in partition $a^1$, and, seeking to escape, he raises the gate F, passes through, and is in the prison-chamber. As the gate F is raised the arm G operates the lever H to release the platform C. The same movement of the gate F, by means of the crank I, lever J, and crank K, raises the inner end of the platform C, which is caught by the catch $d'$ of the bait-hook D, and the trap is set ready for another animal.

Having thus described my invention, I claim as new and desire to secure by Letters Patent—

1. The combination of the crank I, lever J, and crank K, with the swinging-gate F and platform C, substantially as herein shown and described, and for the purpose set forth.

2. The combination of the bait-hook and catch D $d'$, spring E, arm G, catch-lever H, crank I, lever J, and crank K, with the pivoted platform C and swinging gate F, substantially as herein shown and described, and for the purpose set forth.

JOHN ROLLINS.

Witnesses:
JOHN Y. CHRISTIAN,
E. M. DEVANEY.